Dec. 24, 1935.  A. S. FITZ GERALD ET AL  2,025,583
REGULATING SYSTEM
Original Filed Nov. 26, 1930
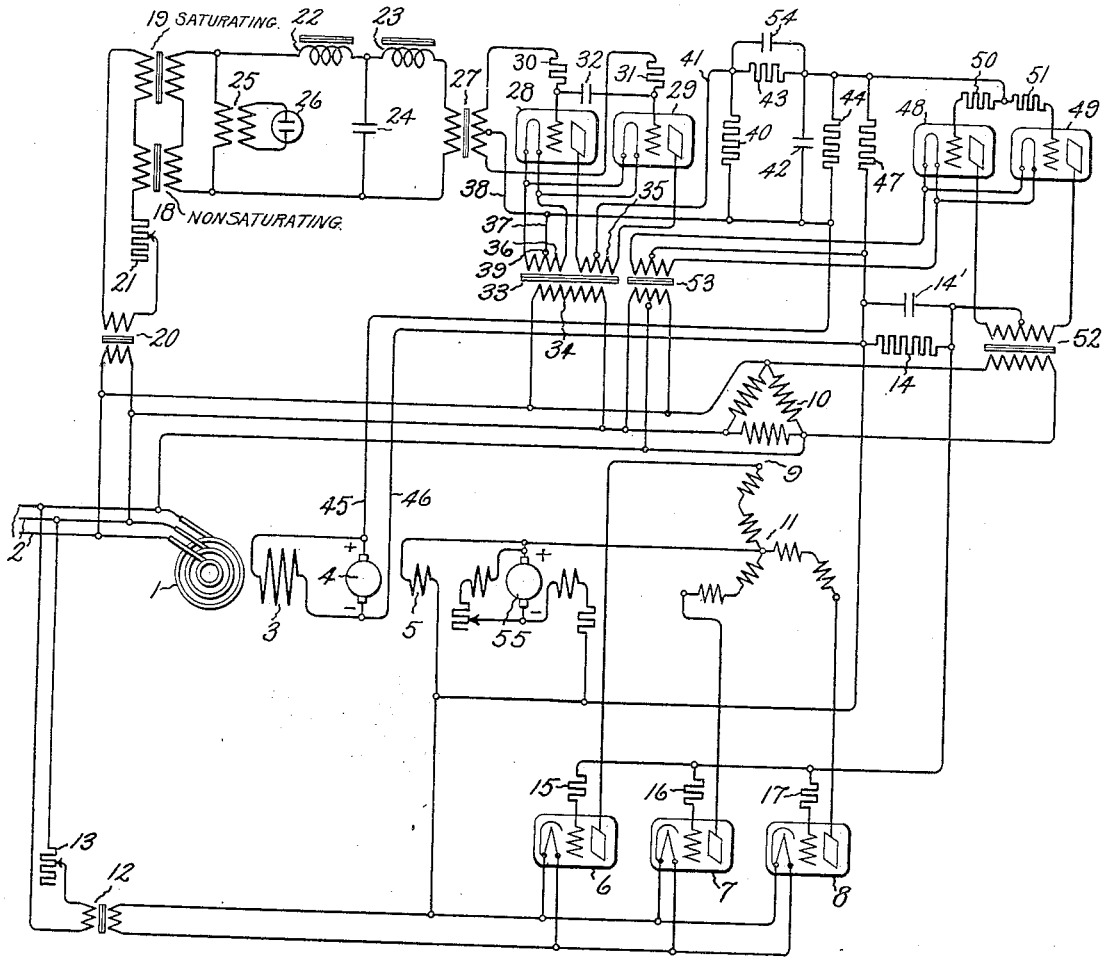
Inventors:
Alan S. FitzGerald,
George W. Garman,
by Charles V. Tullo
Their Attorney.

Patented Dec. 24, 1935

2,025,583

UNITED STATES PATENT OFFICE 2,025,583

REGULATING SYSTEM

Alan S. Fitz Gerald, Wynnewood, Pa., and George W. Garman, Scotia, N. Y., assignors to General Electric Company, a corporation of New York Application November 26, 1930, Serial No. 498,416
Renewed June 14, 1935

13 Claims.  (Cl. 171—119)

Our invention relates to electrical regulating systems and more particularly to regulating systems employing electric discharge devices or electric valves for controlling an electrical characteristic of a dynamo-electric machine or circuit.

Various regulating systems employing electric discharge devices have been proposed in the past for regulating the voltage or other electrical condition of a machine or circuit. Many of these regulating systems are incapable of producing the fine degree of regulation required for stable operation of a machine or circuit under the various conditions of operation encountered in practice and although moving contacts are eliminated and quick response is obtained many of these systems fail to equal in performance in all respects quick-acting electro-mechanical types of regulators, such as regulators of the Tirrill type.

It is an object of our invention to provide a new and improved regulating system that does not involve the use of moving contacts and is both sensitive and reliable in its operation.

Another object of our invention is to provide a new and improved regulating system employing electric discharge devices or electric valves for controlling an electrical characteristic of a dynamo-electric machine.

A further object of our invention is to provide a new and improved regulating system employing electric discharge devices which shall possess all of the advantageous operating features of quick-acting electro-mechanical regulators of the vibratory type without the disadvantages of moving parts or contacts.

In a copending application of Alan S. Fitz Gerald, Serial No. 601,388, filed March 26, 1932 as a continuation of the present application, and assigned to the assignee of the present application, there is described and broadly claimed various features which are incorporated in the regulator and regulating system of our present application in which there is provided a voltage determining circuit which indicates variations in the electrical characteristic to be regulated. This voltage determining circuit varies the anode current of electric discharge devices which in combination with the voltage determining circuit is analogous to the main regulating coil of an electro-mechanical regulator and constitutes the primary control unit of the regulating system. The anode current from the primary control unit in combination with an electrical characteristic of the excitation circuit is used to control an amplifier comprising electric discharge devices the anode current of which controls means for controlling the current output of power electric valves connected so as to energize the excitation winding of a dynamo-electric machine or control the circuit to be regulated. The control is effected by alternately opening and closing the electric valves for a variable number of successive cycles in a manner similar to the time-opened, time-closed effect of the vibratory contacts of a Tirrill type of regulator.

In accordance with our invention we provide additional and improved means to suppress hunting of the regulator and the regulating system and means to increase the regulating range of the regulating system.

Our invention will be better understood from the following description taken in connection with the accompanying drawing and its scope will be pointed out in the appended claims.

Referring to the single figure of the accompanying drawing, which is a diagrammatic representation of one embodiment of our invention, 1 denotes a dynamo-electric machine shown as a synchronous three phase alternator which is connected to a power circuit 2. The alternator 1 is provided with a field winding 3 which is connected to be supplied with an exciting current from a source of direct current such as a direct current generator or exciter 4. The exciter 4 is provided with a field winding 5 which is connected to be energized through electric discharge devices or electric valves 6, 7 and 8 from the alternating current terminals of the alternator or any other convenient alternating current source. These electric valves are each provided with an anode, a cathode, and a control electrode or grid and are preferably of the gaseous or vapor electric type or any form of discontinuous control type of valve because of the greater current carrying capacity of this type as now developed as compared to electric discharge devices or electric valves of the pure electron discharge type in which the current flowing through the valve is continuously controlled by the potential upon the grid. The term discontinuous control type of electric valve is intended to mean that type in which the starting of current in the valve is determined by the potential of its control grid but in which the current through the valve may be interrupted only by reducing the anode potential below its critical value. Transforming means 9 are provided for supplying current from the circuit 2 through the valves to the field winding 5. This transforming means comprises a primary winding 10 preferably delta connected and a secondary winding 11 preferably zig-zag star connected for eliminating direct current magnetization of the transformer cores. The anodes of the valves 6, 7 and 8 are connected respectively to different free terminals of the respective phase windings of the secondary winding 11. The neutral point of the star connected secondary windings is connected to one side of the field winding 5 and the other side of the field winding 5 is connected to the cathodes of the valves. The cathode of each valve is connected to a heating source through any suitable means and as illustrated a transformer 12 is connected across one phase of the alternator terminals to energize the cathodes of each valve. An adjustable resistor 13 is connected in series with the primary winding of transformer 12 for adjusting the value of the heating current. The control electrode or grid of each valve is connected to a grid controlling means illustrated as a resistor 14 through grid resistors 15, 16 and 17 of the valves 6, 7 and 8, respectively. A smoothing condenser 14' is connected across the resistor 14. Control of the valves is obtained by so controlling the grid potential of the valves that the valves pass current during an entire cycle or predetermined number of cycles and block current during a succeeding cycle or predetermined number of cycles. As illustrated in the drawing a unidirectional potential is obtained from the resistor 14 which supplies a potential in one direction to make the valves conducting and supplies a different potential in magnitude or polarity to prevent the current from starting through the valves.

In order to effect the control outlined above it is necessary to provide means to vary the potential drop across the resistor 14 in accordance with variations in the voltage or other electrical characteristic of the machine or circuit to be regulated. A change in voltage corresponding to the change in the voltage to be regulated is produced by means of a balance or bridge circuit and a controlled rectifier. The balance circuit performs the same function as the ordinary type of balance bridge circuit and comprises two transformers 18 and 19. Throughout the operating range of the regulator transformer 19 is arranged to saturate with relatively low currents and transformer 18 is arranged to operate below saturation. The primary windings of these transformers are connected in series and to the alternator terminals through a step-down transformer 20. The secondary windings of these transformers are also connected in series. It will be apparent that for one particular value of current the voltage across the primary winding of each transformer is the same and if these windings are connected in series and in the proper phase relationship no voltage will exist across the terminals of the secondary windings. However, if that particular value of current is changed the circuit will be unbalanced and a difference voltage will exist. It will also be apparent that this difference voltage is a function of the amount that the current is off balance, and that the phase relationship of the difference voltage depends upon whether the current is above or below the balance value. In one case the difference voltage will be approximately in phase with the line voltage and in the other case it will be approximately 180 degrees out of phase with the line voltage. Since the reactance of the transformers varies with frequency it is necessary to utilize some means for preventing the balance point from shifting for different frequencies. An adjustable resistance 21 is connected in series with the primary windings of the transformers for reducing the frequency error and in addition it affords an easy and simple means of changing the balance points so that the regulator will regulate for different line voltages. If the resistance in the circuit is increased the current will decrease, therefore in order to bring the current back to the balance value it is necessary to hold a higher line voltage. Obviously, the converse will reduce the regulated line voltage.

In the description of the balance circuit, immediately preceding, it was stated that for a given balance current no voltage difference existed. That statement was not strictly accurate because a third or higher harmonic is present in the current wave, due to saturation in the saturating transformer. Therefore, in order to reduce the effect of this third harmonic or higher harmonics and at the same time make the circuit only responsive to the fundamental voltage change, a low pass filter is used with a cutoff frequency of the order of 80 cycles. This filter may be of any suitable type known in the art and by way of example we have illustrated a typical network comprising two reactors 22 and 23 connected in series with the circuit from the secondaries of the bridge transformers and a condenser 24 connected to the junction between said reactors and to the other side of the transformer secondary circuit. In order to keep the difference voltage from the bridge within safe limits in case the generator voltage goes to a very high value due to sudden loss of load or any other reason, we connect an impedance in parallel to the series connected secondary windings of the balance circuit which is arranged to have a high impedance for difference voltages below a predetermined value and a relatively low impedance for any difference voltage above the predetermined value. As illustrated, we employ a transformer having its primary winding connected in shunt to the balance circuit transformer and having its secondary winding connected to a glow tube 26. The glow tube might be connected directly across the balance circuit transformer secondary windings but it is more convenient to use a step-up transformer because of the range of difference voltage and the usual characteristics of the readily available glow tubes. The glow tube is arranged to break down and pass current above a critical voltage and thereby prevent an abnormal voltage condition or phase modification of the voltage derived from the filter circuit.

Reviewing briefly, it will be noted that a circuit is provided in which a difference voltage is obtained having a magnitude depending upon the amount the line voltage is different from the value necessary to give the balanced condition, and having an in-phase or reversed-phase relation with respect to the line voltage, depending upon whether the line voltage is above or below the balance point.

To increase the sensitivity of this circuit it is preferable to use a high ratio transformer 27 to step up this difference voltage. It has been found that an amplification of one to twenty-five or one to fifty is satisfactory. It must be clearly understood that the gain in sensitivity is obtained not by increasing the magnitude of the difference voltage but by increasing the change in the difference voltage. That is, if there is a change of one volt produced in the balance circuit, and neglecting any loss in the low pass filter circuit, for every volt change in the line voltage, either a twenty-five volt or a fifty volt change will be produced in the secondary winding of the transformer 27. The secondary winding of this transformer is connected to two controlled rectifiers 28 and 29 preferably electric discharge devices of the high vacuum type. These electric discharge devices are each provided with an anode, a cathode and a control electrode or grid. The grids of the electric discharge devices 28 and 29 are connected to be energized from the difference voltage of the secondary winding of transformer 27 thereby controlling the anode current of these tubes in accordance with variations in the line voltage. The impedance of the grid circuit of the discharge devices depends upon the grid voltage. When it is negative the impedance is usually very high, in the order of megohms, but if the grid is positive the impedance falls off very rapidly and will perhaps be of the order of thousands of ohms. Therefore, if full sensitivity and amplification of the balance circuit and grid transformer is to be obtained it is necessary to work into a high impedance and the grid must therefore, be negative. In order to increase the sensitivity and amplification of this part of the circuit it has been found preferable to insert resistors 30 and 31, each of the order of 400,000 ohms, in series with each grid. A condenser 32 is connected between the grids for the purpose of reducing oscillations and limiting the voltage across transformer 27.

The anode potential is obtained from the line voltage through a transformer 33 provided with a primary winding 34 and a secondary winding 35 having opposite terminals connected to different anodes of the respective discharge devices. The primary winding 34 is connected to be energized in accordance with the line voltage. An additional secondary winding 36 is provided for furnishing heating current to the cathodes of the discharge devices. This secondary winding is provided with a midtap 39 which is connected by means of conductors 37 and 38 to the midtap of the secondary winding of transformer 27 thereby completing the cathode-grid circuit. Due to the amplification of the various parts of the circuit there is a large change in the anode current of the discharge devices 28 and 29 with a small change in line voltage. This change in anode current manifests itself as a change in voltage across a resistance 40 connected in series relation with the anode circuit of the discharge devices 28 and 29 by means of conductors 38 and 41. The circuit is so arranged that when the line voltage drops a small amount there is a large increase in voltage across resistor 40.

In order to prevent the regulator from overshooting, it is desirable to provide damping means performing the analogous function of the dashpot on the alternating current coil lever of a Tirrill type of regulator. The damping is accomplished by charging a condenser 42 through a high resistance 43 by the voltage appearing across resistance 40. The size of the condenser and the resistance through which the condenser is charged is chosen of such a value that the time constant of this part of the circuit is relatively long. To change the damping effect it is therefore merely necessary to change the value of the charging resistor.

If the regulator is used to regulate the voltage on a system in which the load is near or above the steady state limit it has been found that the voltage has a tendency to hunt soon after the steady state limit is passed and that the voltage has a rising characteristic; the decrease during each oscillation being less than the increase. In order to avoid this condition we provide, in accordance with our invention, a resistance 44 connected across the damping condenser 42 so that the rising characteristic is reduced to a minimum within the operating limits of the regulator.

The control circuit described so far gives a voltage across the resistor 44 which determines the voltage which is to be maintained constant. If this voltage were applied directly to the grids of the valves 6, 7 and 8 and caused these valves to pass current when the line voltage was below a predetermined value and block current when the line voltage was above a predetermined value it would not be entirely satisfactory due to hunting. This hunting is inherent in the regulation of an alternator and is caused primarily by the self induction of the alternator field winding. Due to the self induction of the alternator field the alternator voltage with the simple control just described would continue to increase for a time after the electric valves open and continue to decrease after the electric valves close resulting in voltage oscillations having a high amplitude. It is, therefore, necessary to compare the change in alternator voltage with some electrical quantity which is a definite and continuous function of the excitation required by the alternator at normal voltage for any given load condition. The voltage of exciter 4 is such a quantity and is compared with the voltage appearing across the resistor 44 by means of conductors 45 and 46. The time constant of the direct current circuit is relatively small so that as the exciter voltage varies the difference in the two voltages is impressed across a resistor 47 which in turn is used to control an amplifier circuit illustrated as comprising two electric discharge devices 48 and 49 each having an anode, a cathode, and a grid. It will be observed that the condenser 42 and resistor 47 are in a series circuit across the exciter 4. Under transient conditions a change in exciter voltage results in a charging or discharging current to or from condenser 42 which flows through the resistor 47 and provides a voltage component across resistor 47 in a direction to suppress hunting. The grids of the discharge devices 48 and 49 are connected through grid resistors 50 and 51 to one side of the resistor 47. The anode potential supply is obtained from the power circuit 2 and a convenient arrangement, as illustrated, is to connect an anode transformer 52 across one phase of the transformer 10. The cathodes may be heated from any suitable source of current but in order to make provision for proper regulation under conditions of a short circuit or a fault on any one phase of a polyphase system the cathode heating current is obtained by means of transformer 53 from both of the phases not connected to the voltage determining circuit. In case of a short circuit on either of these two phases the emission of the electric discharge devices will be reduced to a value which is too low to control the electric valves 6, 7 and 8 and the maximum amount of excitation will be supplied to the generator field.

Except for very low loads the circuit as outlined would have a tendency to hunt because of the high damping of the voltage determining circuit. In order to overcome this disadvantage and at the same time take care of sudden changes in load, in particular above the steady state limit, a condenser 54 is placed across the resistance 43 in the damping circuit. This condenser has the function that for small changes in the balance voltage the time constant is reduced sufficiently to cause the exciter voltage to change immediately to the proper value. The function of the condenser is analogous to a spring between the dashpot and plunger of the alternating current coil lever of the Tirrill type of regulator. By choosing the constants of the damping circuit condenser 42 and resistance 43 and the quick response condenser 54 so that the time constant of the control circuit approaches that of the excitation circuit, oscillations in the alternator voltage due to the time delay in the excitation circuit may be practically eliminated. The voltage circuit is thus capable of correcting the voltage for small changes in the line voltage instantaneously but it cannot regulate during constant conditions. What actually occurs is that during constant load conditions and power factor the exciter part of the circuit functions in such a manner that the correct value of average field current is maintained in the alternator field. In case there is a sudden change in load the voltage circuit substantially instantaneously causes the secondary control circuit to function and tends to restore the alternator voltage to normal.

It is desirable to have the regulating range of the regulating system from zero exciter armature voltage to the normal value for normal conditions. Zero exciter armature voltage is obtained by bucking down the normal residual exciter excitation by means of a sub-exciter 55. The excitation due to the valves, 6, 7 and 8 is in opposition to that obtained from the sub-exciter so that for normal operation the valve output will overpower the excitation due to the sub-exciter. However, for those conditions in which an exciter armature voltage is desired which is below the residual value, particularly for synchronous condenser operation, the valve output is nearly cut off and the sub-exciter overpowers the residual exciter field and residual value output, thereby giving the desired value of exciter armature voltage.

In operation the average value of the output current of the valves 6, 7 and 8 is varied. Suppose for example, that the valves are allowed to pass current for 10 cycles and then are shut off for 10 cycles, this action being repeated indefinitely. It is quite obvious that if the build-up and build-down rates are the same, that the average value of the excitation will be 50% of the value that would be obtained if the valves pass current continuously. Thus by varying the relative duration of the time during which the valves are passing current to the time which they are shut off, the average value of excitation can be controlled. This is exactly the method of operation of the regulating system hereinbefore described.

To understand clearly the operation of this regulator and regulating system, the action of an electro-mechanical regulator of the Tirrill type, such as is described and claimed in United States Patent No. 725,800, granted April 21, 1903 upon an application of Allen A. Tirrill, should be clearly understood. The regulator disclosed in the aforementioned patent comprises a primary control element and a secondary control element. The function of the primary control element is to determine under any given load condition and power factor, exactly what excitation is necessary to maintain the correct alternator voltage. The purpose of the secondary control element which is governed by the contacts of the primary element, is to produce this excitation. The primary element consists of a multiple-spring biased lever actuated in response to exciter voltage and another damped and balanced lever actuated in response to the alternator voltage. The direct current operated lever carries the upper contact which cooperates with the lower contact carried by the alternating current operated lever. With the minimum exciter voltage the upper contact is at its extreme lower position and with maximum exciter voltage it moves upwards to the limit of its travel. The lower contact lever is balanced at the required alternator voltage and will move through its full travel with a small variation from normal alternator voltage.

Therefore, it is only necessary for the line voltage to change a very small amount to cause the lower contact to move a distance corresponding to the full range of travel of the upper contact which corresponds to a change in alternator field excitation from a no-load to a full-load value. Since the alternating voltage lever is sensitive to line voltage variations at only one particular value of voltage, that value determines the voltage which will be held constant. The alternating voltage lever is damped by means of a dashpot to prevent hunting.

The secondary control element, which is called the relay, is arranged to short circuit sections of resistance in the exciter field circuit intermittently. The exciter armature voltage and therefore the alternator field current is varied by the relative duration of the time during which the relay contacts are closed or opened. For example, as the load on the alternator is increased, the period during which the resistance is short circuited is increased thereby maintaining a higher average value of exciter field current.

Assuming then that the regulator is holding the correct voltage and that the generator is not loaded, the contacts will be intermittently opening and closing. That is, as long as the load and power factor remain constant the excitation required by the alternator will remain constant, and due to the inductance of the alternator field any small changes occurring in the exciter voltage will not be reflected in the alternator voltage, but even if there is an instantaneous variation in alternator voltage no motion will be transmitted to the alternating voltage lever because it is damped. Therefore, the alternating voltage lever will remain fixed; but as soon as the upper and lower contacts close, the exciter voltage will be increased thereby causing the upper lever to rise. This will immediately cause the relay contacts to open and insert resistance in the exciter field circuit which will cause the exciter voltage to decrease. This action will be repeated indefinitely and thus by intermittently increasing and decreasing the exciter armature voltage the correct average value of field excitation is maintained.

If the load on the alternator is increased, the decreased output voltage will permit the alternating voltage lever at the contact end to rise and thereby increase the exciter voltage. The alternating voltage lever will stay at this new position and the exciter voltage will vary about a new point which is higher than the previous one and thereby require a higher average exciter voltage to open the contacts. Conversely, if the load is decreased the contact end of the alternating voltage lever will fall and the exciter voltage will vary about a new and lower point thereby requiring a lower average exciter voltage to open the contacts.

The operation of the embodiment of our invention illustrated in the single figure of the accompanying drawing will now be readily understood. It will be assumed that the alternator is being driven by a suitable prime mover (not shown) and that the exciter residual voltage is sufficient to effect building up of the alternator voltage. At a voltage below the voltage to be maintained, or the balance voltage of the bridge, the difference voltage is arranged to be of such magnitude and phase relation as to increase the grid potential of the discharge devices 28 and 29 in a positive direction so that the anode current of these discharge devices is increased and a unidirectional voltage is obtained across the resistor 40 which varies inversely with the alternator voltage. The voltage across the resistor 40 and consequently the voltage across resistor 44 under the low voltage condition is arranged to be greater than the exciter voltage which is in series opposition therewith. The polarity and magnitude of this resultant voltage is such as to bias the grids of the amplifier discharge devices 48 and 49 in a negative direction so as to make the anode current and consequently the voltage drop across the control resistor 14 a minimum. Under this condition the valves 6, 7 and 8 are arranged to be full on. As a result the field excitation is increased and the exciter voltage is increased to that value required for normal voltage. Just as soon as the exciter voltage attains the normal value the resultant voltage applied to the grids of the amplifier discharge devices decreases the negative bias or increases the grid potential in a positive direction so that the anode current of these devices increases. As a consequence the voltage drop across the resistor 14 increases in a negative direction to shut the valves off.

When the valves shut off the exciter voltage starts to decrease and the amplifier grid potential changes so as to put the valves full on again. The result is that the exciter field current is interrupted intermittently by the grid control action of the valves just as the resistor is open circuited intermittently in the electro-magnetic type of regulator. The voltage across the resistor 44 remains practically constant for a given load condition and corresponds to the relatively fixed position of the contact carried by the alternating voltage lever of the Tirrill type of regulator, whereas the voltage component from the exciter rises and falls about a mean value similar to the vibration about a mean position of the contact carried by the direct current lever of the Tirrill type of regulator. This action causes the valves to close and open to maintain an average alternator excitation corresponding to the given load condition.

Under a given steady state condition of the alternating current circuit the voltage across resistor 44 is substantially constant and the potential across condenser 42 corresponds to the potential across resistor 44. If we assume that the voltage of exciter 4 increases above the voltage across resistor 44 and condenser 42 a charging current flows to condenser 42 and through resistor 47. For the polarity of the exciter as indicated the charging current flows up through condenser 42 towards the upper terminal thereof. During the initial stages of the transient practically all of the current from the exciter flows into the condenser because the other possible paths are of relatively high resistance. This charging current then flows down (as viewed in the drawing) through resistor 47. This direction of flow of charging current through resistor 47 being opposite to the normal direction of the fall of potential is such as to make the grid potential more positive. As the grid potential of valves 48 and 49 becomes more positive the anode current of these valves increases. Since the main valves 6, 7, and 8 are rendered non-conductive by an increase in voltage drop across resistor 14, due to the increased anode current of valves 48 and 49, the main valves are rendered non-conductive at an instant of time prior to the time they normally would be rendered non-conductive as a result of the change in the final resultant voltage between the voltage component of resistor 44 and the voltage component of exciter 4. Similarly, if the voltage of exciter 4 decreases below the potential across condenser 42, a discharge current flows through resistor 47 in the opposite direction from that of the charging current so that the grid potential of valves 48 and 49 is increased in a negative direction. Due to the effect of the discharging current from condenser 42 the main valves 6, 7, and 8 are rendered conductive at an instant of time somewhat prior to the time they would be rendered conductive as a result of the change in the final resultant voltage between the component of voltage of resistor 44 and the component of voltage from exciter 4. Whether the condenser 42 is charging or discharging the voltage across resistor 47 during the transient state varies in accordance with the rate of change of exciter voltage. Thus it is clearly seen that by reason of the charging and discharging current of the condenser 42 flowing through resistor 47 when the exciter voltage rises above and falls below the voltage across the condenser, a current is superimposed on the current then flowing in resistor 47 which provides a change in voltage in the proper direction to prevent overshooting or hunting and thereby effect stability of the regulating action.

If the load on the alternator increases and the line voltage decreases from the value to be maintained there is a large change in the voltage across resistor 44, which corresponds to the large movement of the lower contact of the Tirrill type of regulator for a small change in voltage. This action means that the exciter voltage does not have to vary as far from the mean value before the valves are full on so that the valves are on for a greater period of time than they are off. In other words, the ratio of time-closed to time-opened of the valves is increased and the mean average excitation of the alternator is increased to maintain the alternator voltage for the new load condition. For a decrease of load and an increase in terminal voltage above the normal value the exciter voltage must vary farther from the mean value before the valves are full on so that the valves are off for a greater period than they are on. In other words, the ratio of time-closed to time-opened of the valves is decreased and the mean average excitation of the alternator is decreased to maintain the alternator voltage for the new load condition.

While we have shown and described a particular embodiment of our invention it will be obvious to those skilled in the art that changes and modifications may be made without departing from our invention and we, therefore, aim in the appended claims to cover all such changes and modifications as fall within the true spirit and scope of our invention.

What we claim as new and desire to secure by Letters Patent of the United States is:

1. The combination of a dynamo-electric machine comprising excitation and armature circuits, means comprising an electric valve for controlling the energization of said excitation circuit, means connected to said armature circuit comprising an electric discharge device having a grid for controlling the average output current of said valve, a damping circuit for delaying a change in the grid potential of said discharge device, and means for substantially instantaneously changing said grid potential in accordance with sudden changes in an electrical characteristic of said dynamo-electric machine, the time constant of the circuit including said damping circuit and the circuit of said last mentioned means being of the same order of magnitude as the time constant of said excitation circuit.

2. The combination of a dynamo-electric machine comprising excitation and armature circuits, means comprising an electric valve having a control electrode, for controlling the energization of said excitation circuit, means connected to said armature circuit comprising an electric discharge device having a grid for controlling the potential of the control electrode of said valve, a damping circuit comprising a condenser connected in series relation with a resistor for delaying a change in the grid potential of said discharge device, and a condenser connected in parallel to said resistor.

3. The combination of a dynamo-electric machine comprising excitation and armature circuits, means comprising an electric valve having a control electrode for controlling the energization of said excitation circuit, means connected to said armature circuit comprising an electric discharge device, for controlling the potential of the control electrode of said valve, a damping circuit comprising a condenser connected in series with a resistor for delaying a change in the grid potential of said discharge device, and a condenser connected in parallel to said resistor, said condensers and resistor being so chosen in value as to make the time constant of the control circuit of said valve approach the time constant of said excitation circuit.

4. In combination, a dynamo-electric machine, an excitation circuit therefor, an exciter connected to said excitation circuit, a field winding for said exciter, an electric valve for controlling the energization of said field winding, and means comprising a source of voltage connected to said field winding and acting in opposition to the energization controlled by said electric valve.

5. In combination, an alternating current machine, an excitation circuit therefor, an exciter connected to said excitation circuit, a field winding for said exciter, an electric valve for controlling the energization of said field winding, and a sub-exciter connected to said field winding in opposition to the energization controlled by said electric valve.

6. In combination, an alternating current machine comprising excitation and armature circuits, a voltage determining circuit connected to said armature circuit and arranged to furnish a difference voltage varying in accordance with the variation in the voltage of said armature circuit above or below a predetermined value, means for rectifying said difference voltage, means for combining said rectified voltage and a voltage component varying in accordance with the voltage of said excitation circuit, an amplifier comprising an electric discharge device provided with an anode circuit and a control grid, said control grid being connected to be energized in accordance with the resultant voltage of said combined rectifier and excitation voltage components, means for delaying the variations of the voltage on said grid, means for modifying the effect of said delay in accordance with sudden changes in the voltage of said machine, an electric valve for controlling the energization of said excitation circuit to control the voltage of said armature circuit, and means for controlling said electric valve in accordance with variations in the anode current of said electric discharge device.

7. In a regulating system, an alternating current generator comprising excitation and load circuits, an electric valve provided with a control electrode, for interconnecting said circuits, a voltage determining circuit comprising series connected saturating and non-saturating transformers connected to said load circuit, a low-pass wave filter connected in the output circuit of said transformers, a step-up transformer connected to the output terminals of said filter, a full-wave rectifier comprising a plurality of electric discharge devices each provided with an anode and a grid, said grid being connected to be energized in accordance with the output voltage of said step-up transformer, a first resistor in the anode circuit of said discharge devices, a damping circuit comprising a second resistor and first condenser connected in series relation across said first resistor, a second condenser connected in parallel to said second resistor, a third resistor connected in parallel to said first condenser, a fourth resistor connected to be energized in accordance with the voltage across said third resistor and the voltage of said excitation circuit, an amplifier comprising a plurality of electric discharge devices each having an anode and a grid, the grids of said amplifier discharge devices being connected to be energized from said fourth resistor, and a fifth resistor connected in the anode circuit of said amplifier, the control electrode of said electric valve being connected to be energized in accordance with the voltage across said fifth resistor.

8. In combination, a polyphase alternating current machine having an armature circuit and an excitation winding, an exciter connected to energize said excitation winding, a field winding for said exciter, a plurality of electric valves each having an anode, a cathode, and a control electrode and connected respectively to different phases of said machine and to said field winding, voltage determining means comprising series connected saturating and non-saturating transformers connected to one phase of said armature circuit, a low-pass wave filter connected in the output circuit of said transformers, a step-up transformer connected to the output terminals of said filter, a full wave rectifier comprising a plurality of electric discharge devices each provided with an anode and a grid, said grids being connected to be energized from said step-up transformer, a first resistor in the anode circuit of said discharge devices, a damping circuit comprising a second resistor and a first condenser connected in series across said first resistor, a second condenser connected across said second resistor, a third resistor connected across said first condenser, a fourth resistor connected in parallel to said third resistor and said exciter, an amplifier comprising a plurality of electric discharge devices each having an anode, a cathode and a grid, the cathodes of said amplifier being connected to be energized from the remaining phases of said machine not connected to said voltage determining means, the grids of said amplifier being connected to said fourth resistor, and a fifth resistor connected in the anode circuit of said amplifier, the control electrode of said electric valve being connected to be energized in accordance with the voltage across said fifth resistor.

9. In a regulating system comprising, in combination, a dynamo-electric machine, a thermionic tube having a controlling circuit and a controlled circuit associated therewith, means influenced by a characteristic of the dynamo-electric machine for impressing a potential upon the controlling circuit of said tube, exciting means controlled by the current in the controlled circuit of said tube for governing the said machine characteristic, and means for preventing overshooting of the governing action comprising a resistor and a condenser disposed in series relation and energized by the voltage of the said exciting means, said resistor being included in the controlling circuit of said tube to modify the potential impressed thereon in accordance with the direction and rate of change of the voltage of the said exciting means.

10. The combination of a vacuum tube having an anode, a cathode, and a control electrode, an electrical machine having an exciting winding, a circuit and associated means for impressing upon said control electrode a potential dependent upon a characteristic of said machine, means for controlling said characteristic comprising an exciter for energizing said machine winding, means for adjusting the voltage of said exciter comprising a circuit controlled by said tube and means for preventing overshooting of the controlling action comprising means energized from said exciter and disposed in the potential supply circuit of said control electrode for modifying the potential impressed upon the control electrode of said vacuum tube in accordance with the direction and rate of change of the exciter voltage.

11. In a voltage-regulating system comprising, in combination, a generator having a field winding, a vacuum tube having a controlled circuit and a controlling circuit connected to said generator, an exciter for energizing said generator-field winding, and means connected to the controlling circuit of said tube and responsive to the voltage of said generator for controlling the voltage of said exciter, means for modifying the potential in said tube controlling circuit in accordance with the direction and rate of change of the generator excitation comprising a resistor and a condenser disposed in series relation for energization by the voltage impressed upon said generator-field winding, said resistor being connected in the controlling circuit for the vacuum tube.

12. In a system for regulating a characteristic of an electric machine having a field winding and an exciter for energizing said winding, a thermionic tube having an anode, a cathode, and a control electrode, means for adjusting the voltage of said exciter comprising a circuit including said anode and cathode, means comprising a circuit for impressing upon said control electrode a potential determined by the said characteristic of the machine, a resistor included in said electrode circuit, a condenser joined with one terminal of said resistor and means whereby the voltage of said exciter is caused to energize said resistor and condenser in series to effect stability of the regulating actions.

13. The combination of a dynamo-electric machine comprising excitation and armature circuits, means comprising an electric valve having a control electrode, for controlling the energization of said excitation circuit, means connected to said armature circuit comprising an electric discharge device having a grid, for controlling the potential of the control electrode of said valve, a damping circuit for delaying a change in the grid potential of said discharge device, and means for substantially instantaneously changing said grid potential in accordance with sudden changes in an electrical characteristic of said dynamo-electric machine.

ALAN S. FITZ GERALD.
GEORGE W. GARMAN.